(12) United States Patent
Kamat

(10) Patent No.: US 8,793,320 B2
(45) Date of Patent: Jul. 29, 2014

(54) COMMUNICATIONS SYSTEM WITH POLLING SERVER PROVIDING DYNAMIC RECORD ID POLLING AND RELATED METHODS

(75) Inventor: Harshad Kamat, Sammamish, WA (US)

(73) Assignee: BlackBerry Limited, Waterloo, Ontario (CA)

( * ) Notice: Subject to any disclaimer, the term of this patent is extended or adjusted under 35 U.S.C. 154(b) by 657 days.

(21) Appl. No.: 12/708,728

(22) Filed: Feb. 19, 2010

(65) Prior Publication Data

US 2011/0208815 A1    Aug. 25, 2011

(51) Int. Cl.
 *G06F 15/16* (2006.01)

(52) U.S. Cl.
 USPC ............ 709/206; 709/203; 709/207; 709/224

(58) Field of Classification Search
 USPC ................ 709/203, 206, 217, 224, 225, 207; 455/412.1
 See application file for complete search history.

(56) References Cited

U.S. PATENT DOCUMENTS

| | | | | |
|---|---|---|---|---|
| 5,935,211 | A  * | 8/1999 | Osterman ..................... | 709/228 |
| 7,092,247 | B2 | 8/2006 | Kim | |
| 7,184,753 | B2 * | 2/2007 | Huynh ........................ | 455/412.1 |
| 7,206,816 | B2 * | 4/2007 | Gorty et al. .................... | 709/206 |
| 7,363,026 | B2 * | 4/2008 | Clarke et al. ................ | 455/412.2 |
| 7,788,331 | B2 * | 8/2010 | Gorty et al. .................... | 709/224 |
| 8,275,841 | B2 * | 9/2012 | Heinla et al. .................. | 709/206 |
| 8,296,369 | B2 * | 10/2012 | Kamat et al. .................. | 709/206 |
| 8,307,036 | B2 * | 11/2012 | Kamat et al. .................. | 709/207 |
| 8,463,856 | B2 * | 6/2013 | Kamat .......................... | 709/206 |
| 8,510,390 | B2 * | 8/2013 | Kamat .......................... | 709/206 |
| 8,655,319 | B2 * | 2/2014 | Clarke et al. ................ | 455/412.1 |
| 2004/0205770 | A1 * | 10/2004 | Zhang et al. ................... | 719/313 |
| 2005/0164703 | A1 * | 7/2005 | Huynh ........................ | 455/432.3 |
| 2005/0171996 | A1 * | 8/2005 | Gorty et al. .................... | 709/202 |
| 2005/0210128 | A1 * | 9/2005 | Cannon et al. ................ | 709/224 |
| 2006/0173971 | A1 | 8/2006 | Russell ......................... | 709/217 |
| 2006/0293032 | A1 * | 12/2006 | Clarke et al. ................ | 455/412.2 |
| 2007/0027987 | A1 * | 2/2007 | Tripp et al. .................... | 709/225 |
| 2007/0073815 | A1 * | 3/2007 | Kamat et al. .................. | 709/206 |
| 2007/0130273 | A1 * | 6/2007 | Huynh .......................... | 709/206 |

(Continued)

OTHER PUBLICATIONS

*Fetchmail*: Red hat Linux 7,3: the Official Red Hat Linux Reference Guide, Chapter 16: Email; htttp://www.oit. uci.edu/dcslib/linux/rh-7.3/rhl-rg-en-7.3/sl-email-fec . . . Date: Nov. 9, 2009.

(Continued)

*Primary Examiner* — Ramy M Osman
(74) *Attorney, Agent, or Firm* — Allen, Dyer, Doppelt, Milbrath & Gilchrist, P.A.

(57) ABSTRACT

A communications system may include at least one data storage device configured to store electronic messages and record identifications (IDs) therefor in respective accounts, and a plurality of mobile wireless communications devices each associated with a respective account. The system may further include at least one polling server configured to perform polling requests of the at least one data storage device and retrieve therefrom respective record IDs for each account, with each polling request being for a selectable number of record IDs. The polling server(s) may also be configured to selectively change the number of record IDs in each polling request based upon an estimated number of electronic messages stored in a respective account, and cause electronic messages to be delivered to respective mobile wireless communications devices based upon the record IDs.

25 Claims, 7 Drawing Sheets

(56) References Cited

U.S. PATENT DOCUMENTS

| | | | |
|---|---|---|---|
| 2007/0136464 A1* | 6/2007 | Gorty et al. | 709/224 |
| 2007/0156822 A1 | 7/2007 | Modaresi | 709/206 |
| 2008/0155028 A1* | 6/2008 | Martin et al. | 709/206 |
| 2010/0005148 A1* | 1/2010 | Clarke et al. | 709/206 |

OTHER PUBLICATIONS

"Frequintly asked questions and useful information" http://www.med.monash.edu.au/tsg/multimedia/faq.html: Printed Jul. 20, 2012.

* cited by examiner

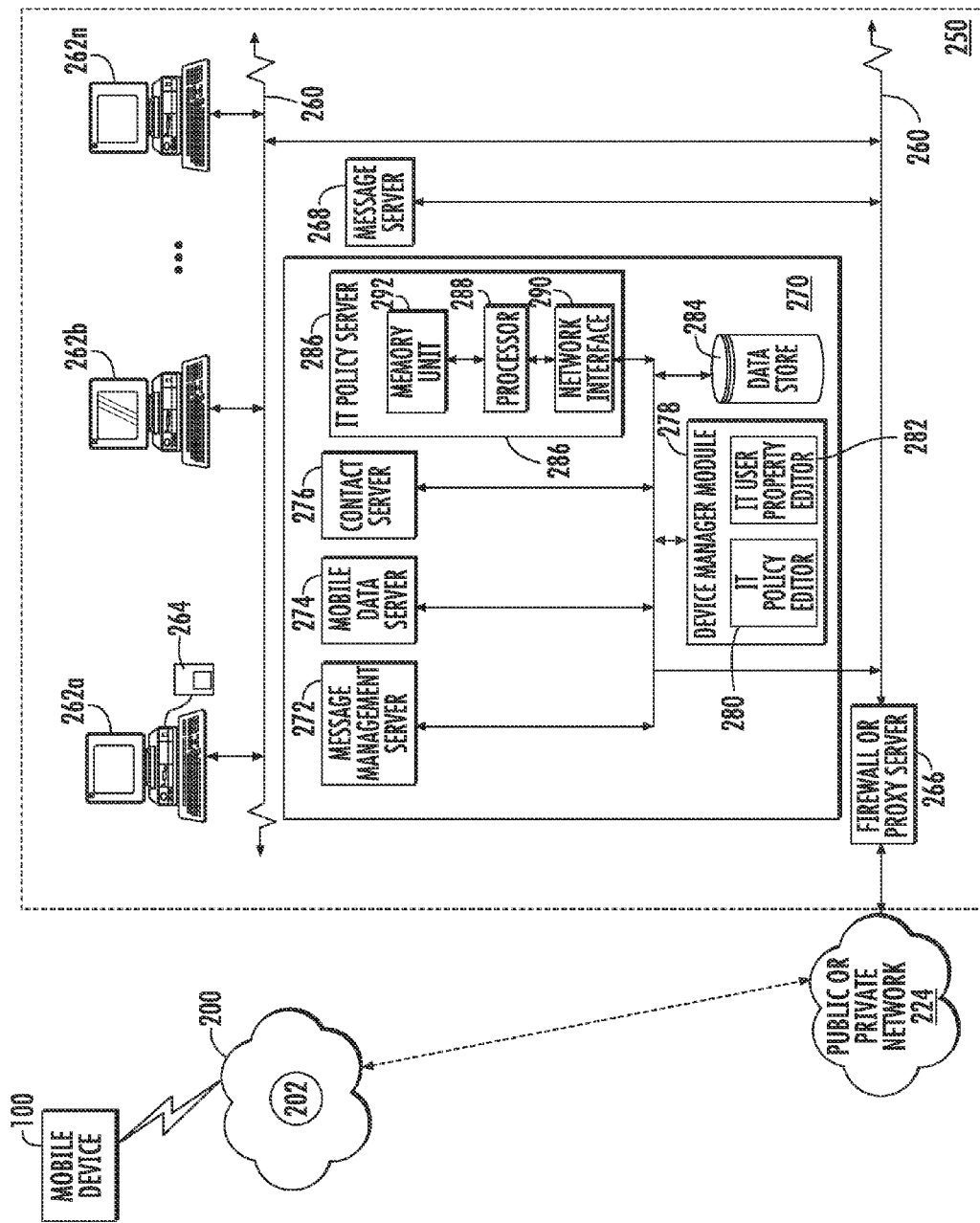

COMMUNICATIONS SYSTEM WITH POLLING SERVER PROVIDING DYNAMIC RECORD ID POLLING AND RELATED METHODS

TECHNICAL FIELD

This application relates to the field of communications, and more particularly, to electronic record systems and related methods.

BACKGROUND

Electronic mailboxes reside on electronic mail (email) servers and are used to store email messages. Electronic mailboxes are connected to the Internet to enable users to send and receive incoming and outgoing email messages. These mailboxes may also be extended to deliver email to mobile wireless communication devices via wireless networks. In the case of a corporation, electronic mailboxes are typically located on email servers at the corporation. On the other hand, mailboxes for small businesses or individuals are typically located on Internet service provider (ISP) email servers.

Mail user agents (MUAs) are applications which use a technique called polling to relay messages from the email server to the mail program at a user's computer or mobile wireless communications device. A MUA is a program running either on a user's personal computing device (mobile or stationary), or on a shared email relay or polling server that checks for new mail on behalf of a multitude of such users. More particularly, polling is the retrieval of incoming messages from other users at the mail server and delivery of these messages to the user's mailbox. Such systems may also poll for other record types, including address records, calendar records, etc.

One potential difficulty in detecting new email messages on email servers is that as the number of system users grows, so too does the number of mailboxes that the MUA will have to poll for email messages. As such, it may be desirable in certain applications to provide efficient approaches for polling operations to reduce over-utilization and/or under-utilization of polling resources at any given time.

BRIEF DESCRIPTION OF THE DRAWINGS

FIG. 7 is a block diagram illustrating components of a host system in one example configuration for use with the wireless network of FIG. 6 and the mobile device of FIG. 4.

DETAILED DESCRIPTION

Figure 1:
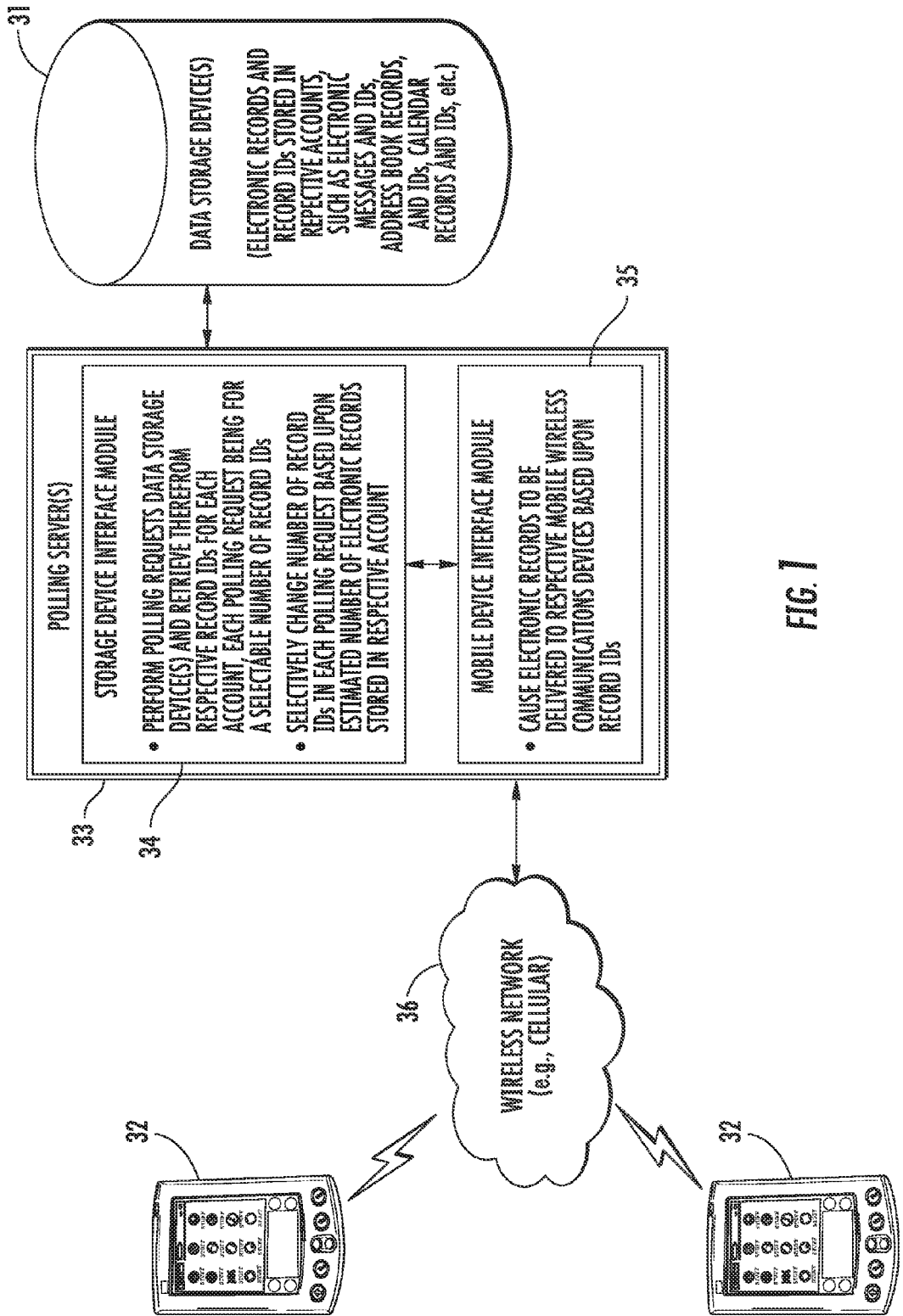
FIG. 1 is a schematic block diagram of a communications system in accordance with an example embodiment.

The present description is made with reference to the accompanying drawings, in which example embodiments are shown. However, many different embodiments may be used, and thus the description should not be construed as limited to the example embodiments set forth herein. Rather, these example embodiments are provided so that this disclosure will be thorough and complete. Like numbers refer to like elements throughout.

Generally speaking, a communications system is disclosed herein which may include at least one data storage device configured to store electronic records and record identifications (IDs) therefor in respective accounts, and a plurality of mobile wireless communications devices each associated with a respective account. The system may further include at least one polling server configured to perform polling requests of the at least one data storage device and retrieve therefrom respective record IDs for each account, each polling request being for a selectable number of record IDs. The at least one polling server may be further configured to selectively change the number of record IDs in each polling request based upon an estimated number of electronic records stored in a respective account, and cause electronic records to be delivered to respective mobile wireless communications devices based upon the record IDs. The system may thereby usefully provide greater efficiencies in performing the polling requests, for example.

More particularly, the at least one polling server may be configured to selectively change the number of record IDs in each polling request also based upon a time of completion of a prior request. Furthermore, the at least one polling server may have an available memory level, and the at least one polling server may be configured to selectively change the number of record IDs in each polling request also based upon the available memory level. In addition, the at least one polling server may be configured to selectively change the number of record IDs in each polling request also based upon a target number of requests to retrieve all record IDs for a given account. Further, the at least one polling server may be configured to selectively change the number of record IDs in each polling request also based upon a minimum or maximum record ID request limit.

The at least one polling server may be configured to determine new and deleted electronic records for the accounts based upon the polled record IDs. By way of example, the mobile wireless communications devices may comprise cellular devices, and the electronic records may comprise electronic messages (e.g., email messages, SMS messages, MMS messages, etc.), address book records, calendar records, task records, notes records, etc., as will be appreciated by those skilled in the art.

A related polling server is for use with at least one data storage device configured to store electronic records and record IDs therefor in respective accounts and a plurality of mobile wireless communications devices each associated with a respective account. The polling server may include a storage device interface module configured to perform polling requests of the at least one data storage device and retrieve therefrom respective record IDs for each account, with each polling request being for a selectable number of record IDs. The storage device interface module may also be configured to selectively change the number of record IDs in each polling request based upon an estimated number of electronic records stored in a respective account. The polling server may also include a mobile device interface module cooperating with the storage device interface module and configured to cause electronic records to be delivered to respective mobile wireless communications devices based upon the record IDs.

A related communications method may include storing electronic records and record IDs therefor in respective accounts on at least one data storage device, and associating a plurality of mobile wireless communications devices with respective accounts. The method may further include perform polling requests of the at least one data storage device and retrieving therefrom respective record IDs for each account using at least one polling server, with each polling request being for a selectable number of record IDs. The method may further include selectively changing the number of record IDs in each polling request based upon an estimated number of electronic records stored in a respective account using the at least one polling server, and causing electronic records to be delivered to respective mobile wireless communications devices based upon the record IDs using the at least one polling server.

Figure 2:
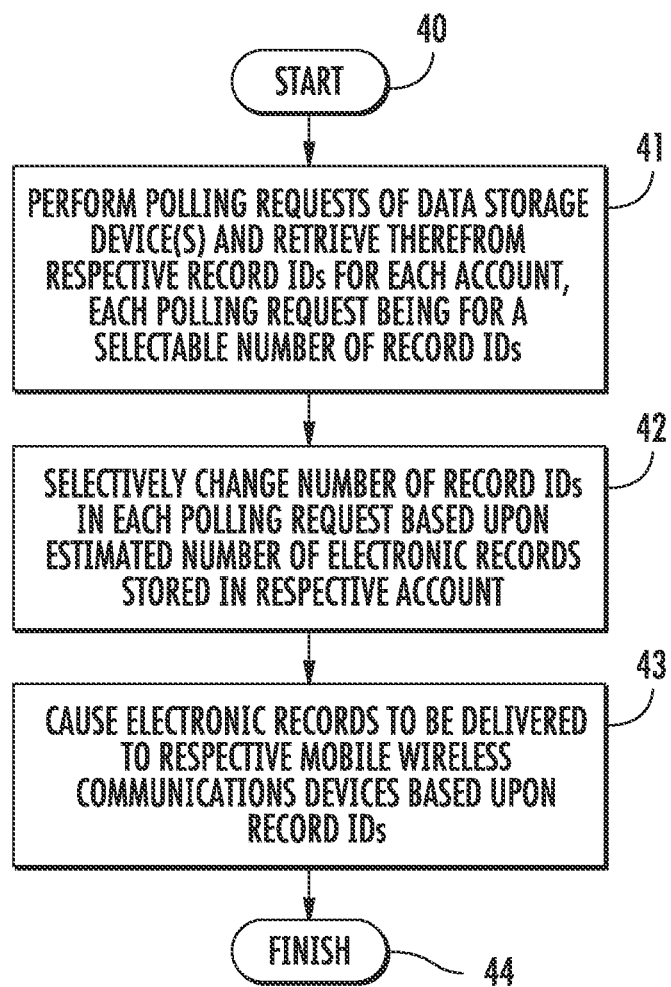
FIGS. 2 and 3 are flow diagrams illustrating method aspects associated with the system of FIG. 1.

Referring initially to FIGS. 1 and 2, a communications system 30 and associated method aspects are first described. The system 30 illustratively includes one or more data storage devices 31 configured to store electronic records and corresponding records identifications (IDs) therefor in respective accounts. By way of example, such records may include electronic messages (e.g., email messages, SMS messages, MMS messages, etc.), address book records, calendar records, task records, notes records, etc., as will be appreciated by those skilled in the art. In the case of email messages, the data storage device 31 may take the form or a corporate or ISP email server(s) on which individual user accounts are established including one or more mailboxes or folders (e.g., inbox, outbox, sent items, drafts, etc.) for storing email messages. For clarity of explanation, the example embodiments set forth herein will be described with reference to email message polling, but it will be appreciated that these example embodiments may be similarly used for other electronic record polling applications, such as those noted above.

The system 30 further illustratively includes a plurality of mobile wireless communications devices 32 (also referred to as "mobile devices" herein) each associated with a respective one of the accounts. That is, each mobile device 32 is configured to receive email messages from (and optionally send emails through) a respective email account hosted on the data storage device 31, as will be appreciated by those skilled in the art. Again, the system 30 may be used with electronic message types (or more generally, electronic records) other than email messages, such as Short Message Service (SMS) messages, Multimedia Messaging Service (MMS) messages, etc., for example.

The system 30 further illustratively includes one or more polling servers 33. The polling server 33 illustratively includes a storage device interface module 34 which communicates with the data storage devices(s) 31, and a mobile device interface module 35 which communicates with the mobile devices 32. By way of example, the storage device interface module 34 and data storage device(s) 31 may communicate via a wide area network (WAN), such as the Internet, or in some example embodiments they may be co-located and communicate via a local area network (LAN), for example. The mobile device interface module 35 may communicate with the mobile devices 32 via one or more wireless networks 36, such as cellular networks, for example. It should also be noted that the polling server(s) 33 and wireless network(s) may similarly communicate via a LAN or WAN. Moreover, in some example embodiments the wireless network 36 may take other forms than a cellular network, such as wireless LAN (e.g., 802.11, Bluetooth, etc.), WiMAX, etc., as will be appreciated by those skilled in the art.

Beginning at Block 40, the storage device interface module 34 is configured to perform polling requests of the data storage device(s) 31 and retrieve therefrom respective record IDs for each account, at Block 41. For example, data storage devices 31 may be implemented as part of an email hosting system such as for Gmail™ accounts, Yahoo® Mail accounts, corporate email accounts, etc., and the storage device interface module 34 polls these data storage devices for record IDs. This allows the storage device interface module 34 to compare the polled record IDs with a prior list of retrieved record IDs to determine when new messages are present so that they may be delivered to respective mobile devices 32, at Block 43. Moreover, this also allows the storage device interface module 34 to determine whether previously received messages have been deleted, such as if the messages are accessed through an Internet or corporate interface as opposed to a wireless device 32, for example. The respective mobile device 32 may be updated accordingly, as will be appreciated by those skilled in the art.

One potential problem associated with this type of polling server arrangement is that of large mailboxes, i.e., mailboxes that have a large number of stored messages and record IDs that have to be parsed to determine new or deleted messages. More particularly, large mailboxes consume a disproportionate amount of system resources, namely processing, memory, and database resources. This, in turn, causes delays in polling, which may result in an overall degradation in service for other users.

The storage device interface module 34 may usefully be configured to perform adaptive polling based upon mailbox size, for example, to use system resources more effectively and help mitigate the above-noted problems associated with large mailboxes. More particularly, the polling requests from the storage device interface module 34 may be for a selectable number of record IDs. As such, the storage device interface module 34 may be configured to selectively change the number of record IDs in each polling request based upon an estimated number of electronic messages stored in a respective account, at Block 42. This estimation may be further refined, such as by assuming a particular number of new email messages are added to the given account between pollings based upon an individual or collective user average, etc., and this number may vary depending on the time (e.g., more emails may be received during business hours than late evening, etc.). The estimation may also be based upon intermediate pollings between full polls in which only new or deleted record IDs are retrieved. Another approach is to query the data storage device 31 directly for the size of the mailbox to determine the estimated number of electronic messages therein. This may be considered an estimate in that the number of record IDs present in the given account may be different when the actual polling operation subsequently occurs (i.e., because new messages were received or old messages deleted in the interim). The method of FIG. 2 is illustratively concluded at Block 44, although it will be appreciated that the polling and message delivery functions performed by the polling server 33 may continue indefinitely in actual operation.

Figure 3:
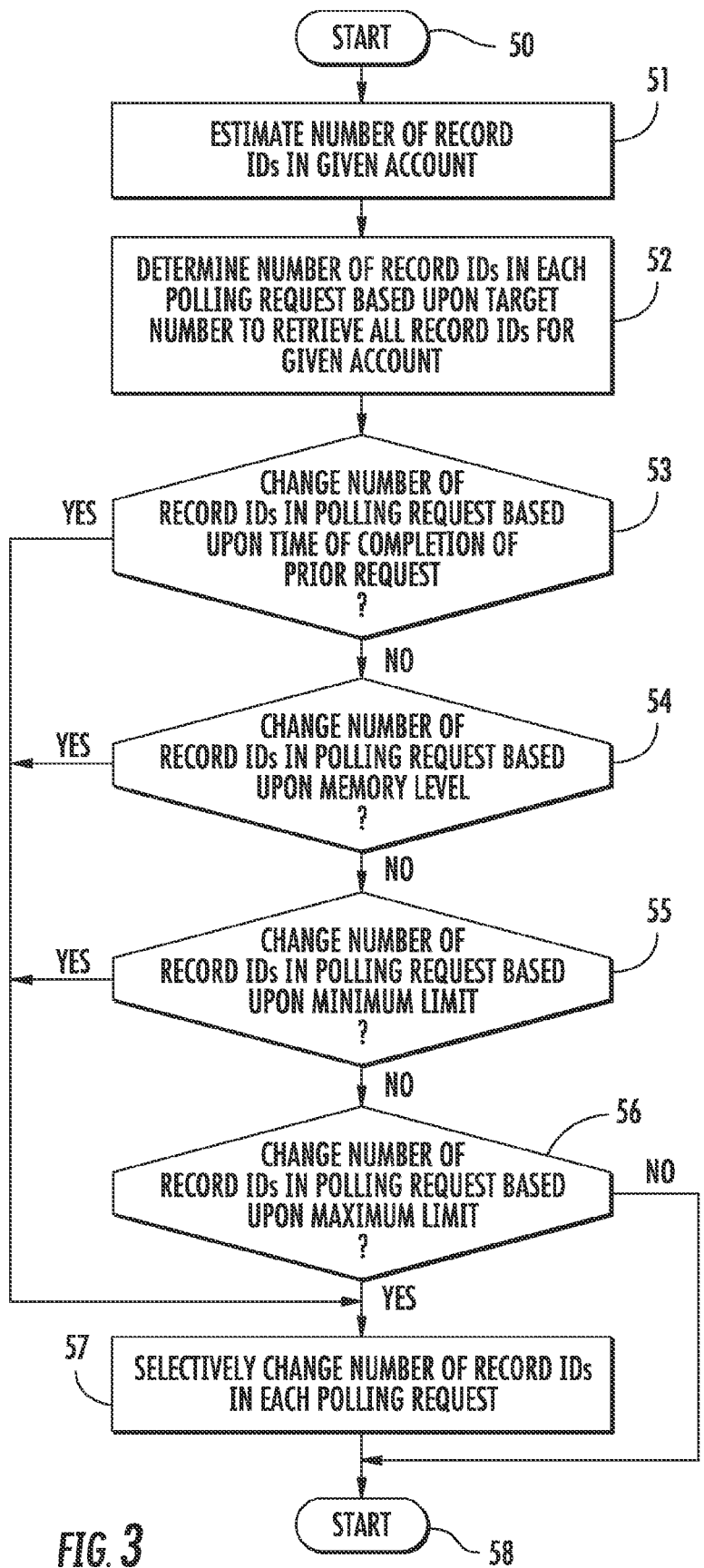

Referring additionally to FIG. 3, beginning at Block 50, the storage device interface module 34 may store a prior number of record IDs that were returned during a previous polling operation, and this number may be used as the estimated number of electronic messages that will be present during the next full polling to retrieve all of the record IDs in the account, at Block 51. This estimation may be determined using any of the estimation techniques discussed above for Block 42 of FIG. 3.

At Block 52, an initial number of record IDs is determined for the polling requests of a given account, by using a target number of requests may be used. More particularly, the storage device interface module 34 may be configured to divide the estimated number of electronic messages for a given account by a target number of requests, or round trips, to retrieve all of the stored record IDs from the data storage device 31. Thus, for example, if the estimated number of record IDs on the data storage device 31 is 10,000 and the desired number of target or round trips to the data storage device to obtain all of the record IDs is ten, then the number of record IDs to be used for each of the ten polling requests is 1,000 (i.e., 10,000 divided by 10). Considered alternatively, a "page size" of 1,000 record IDs is used for each polling request during a full polling cycle, where the polling cycle comprises the ten trips to the data storage device 31 to obtain all of the record IDs stored in the given mailbox(es).

Other factors may be considered when selectively changing the page size besides the estimated number of stored electronic messages for a respective account. For example, the storage device interface module 34 may be configured to selectively change the number of record IDs in each polling request based upon a time of completion of a prior request, at Block 53. That is, if a prior request took a relatively long time to complete, this may indicate that the data storage device 31 is heavily loaded and a smaller polling request size is appropriate. On the other hand, if a request is completed relatively quickly, this may mean that the data storage device 31 can handle larger requests at that particular time.

However, if it is determined that delays are a result of network latency, then it may be desirable to request a larger page size to return more messages at a time, as larger page sizes may not have as much of an effect on network (e.g., Internet) transmission times as on data storage device 31 processing times, as will be appreciated by those skilled in the art. Thus, if network latency is relatively high, it may be more efficient to request a larger number of record IDs at a time if data storage device processing times are not adversely affected.

Furthermore, the polling server 33 may have an available memory level, and the storage device interface module 34 may be configured to selectively change the number of record IDs in each polling request also based upon the available memory level, at Block 54. Thus, for example, if the available memory of the polling server 33 is relatively low, then a smaller number of record IDs may be appropriate in each polling request, and vice-versa when the available memory level is higher.

In addition, it may be desirable in some applications to impose a minimum or maximum record ID request limit. That is, the storage device interface module 34 may be configured to selectively change the number of record IDs in each polling request also based upon a minimum or maximum record ID request limit, at Blocks 55-56. As such, if the initial number of record IDs to be polled exceeds a maximum record ID request limit, then the maximum request limit may be used instead of the initial number. Similarly, if the initial number of record IDs is below a minimum record ID request limit, then the minimum request limit may instead be used.

If time of completion of prior requests, memory level, or minimum or maximum request limits require a change to the initial or default page size, then this number is selectively changed accordingly, at Block 57, thus concluding the method illustrated in FIG. 3 (Block 58).

It will therefore be appreciated that the above-described approach is useful in that utilizing a higher page size, when appropriate, will in turn require fewer round trips to the data storage device 31 and thus a shorter poll time. A shorter poll time will result in quicker message delivery to the mobile devices 32, and better overall performance for the system 30.

The foregoing will be further understood with reference to a use case example. In an implementation of the system 30, it was observed that with a default page size of 500, a full poll of a Yahoo® mailbox with 23,000 messages took 123 seconds to complete. Yet, using the above-described dynamic polling approach in which the number of record IDs to be used for polling a given account (i.e., mailboxes) is varied based upon an estimated number of messages therein, the time to complete the polling was significantly reduced. More particularly, using a target number of pollings (i.e., a round trip limit) of ten, this causes the default page size of 500 to be dynamically changed to 2,300 (i.e., 23,000 messages divided by the target of ten gives a page size of 2,300). This change resulted in a full poll of the same Yahoo® mailbox taking only fifty-three seconds, a 57% improvement in the time required to completely poll the given mailbox for all of the record IDs stored therein. The following pseudocode provides an example of how this approach may be implemented:

```
//defaultPageSize = 500;
//mailboxSize = 23000
//roundTripLimit = 10;
//maxPageSize = 5000;
int pageSize = defaultPageSize;
if (mailboxSize > 0) {
    if (roundTripLimit > 0) {
        pageSize = mailboxSize / roundTripLimit;
    }
    if (pageSize < defaultPageSize) {
        pageSize = defaultPageSize;
    }
    elseif (pageSize > maxPageSize) {
        pageSize = maxPageSize;
    }
}
else {
    pageSize = defaultPageSize;
}
return pageSize;
```

The above pseudocode includes "if" statements to ensure that neither the mailbox size of the round trip limit are zero. More particularly, if the mailbox size is zero then the default page size would be used, and no further logic is required. Also, if the round trip limit (i.e., the target number of pollings) is set to zero, then a divide by zero condition would be present, so the "if" logic is used to avoid such occurrence. It should also be noted that in some implementations a default page size need not be used, but from the above example it may be seen that the default page size may usefully provide a minimum page size limit, as well as a starting point for polling if the estimated number of messages stored in the given mailbox is zero. Also, the mailbox size would be the estimated mailbox size noted above and assigned as a variable in the code, although "mailboxSize" is assigned a constant value in the above example for clarity of reference.

It should also be noted that in some example embodiments the number of record IDs to be retrieved during each polling operation of a given polling cycle need not be the same. More particularly, the page size may be stepped or ramped up or down during a given polling cycle, rather than remaining constant, if desired.

Example components of a mobile wireless communications device that may be used in accordance with an example embodiment (e.g. the mobile wireless communications device of FIG. 1) are further described below with reference to FIGS. 4-7. Generally speaking, a mobile device may be configured according to an IT policy. It should be noted that the term IT policy, in general, refers to a collection of IT policy rules, in which the IT policy rules can be defined as being either grouped or non-grouped and global or per-user. The terms grouped, non-grouped, global and per-user are defined further below. Examples of applicable communication devices include pagers, cellular phones, cellular smartphones, wireless organizers, personal digital assistants, computers, laptops, handheld wireless communication devices, wirelessly enabled notebook computers and the like.

The mobile device is a two-way communication device with advanced data communication capabilities including the capability to communicate with other mobile devices or computer systems through a network of transceiver stations. The mobile device may also have the capability to allow voice communication. Depending on the functionality provided by the mobile device, it may be referred to as a data messaging device, a two-way pager, a cellular telephone with data messaging capabilities, a wireless Internet appliance, or a data communication device (with or without telephony capabilities). To aid the reader in understanding the structure of the mobile device and how it communicates with other devices and host systems, reference will now be made to FIGS. 4-7.

Figure 4:
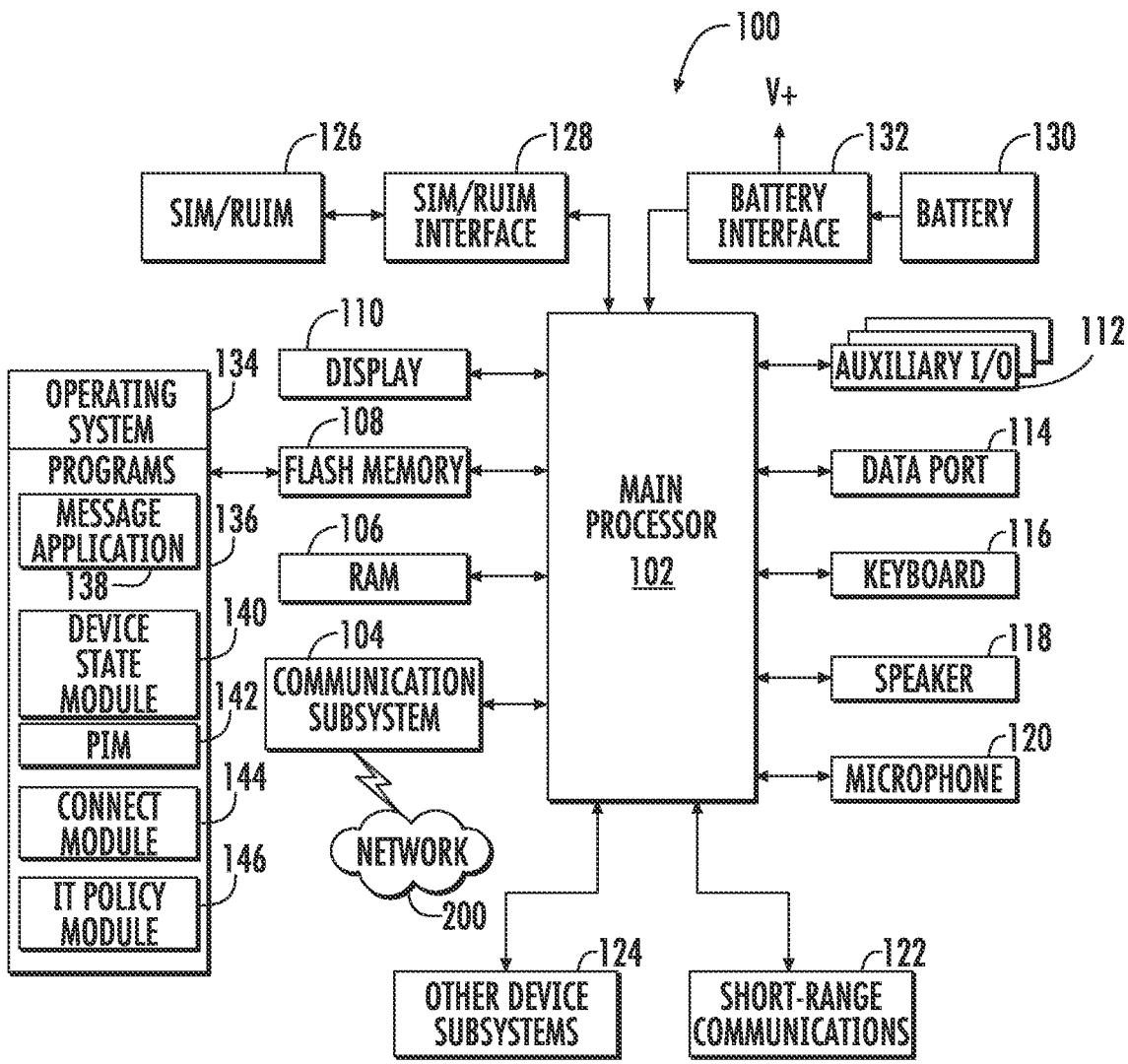
FIG. 4 is a block diagram of an example embodiment of a mobile device that may be used with the system of FIG. 1.

Referring first to FIG. 4, shown therein is a block diagram of an example embodiment of a mobile device 100. The mobile device 100 includes a number of components such as a main processor 102 that controls the overall operation of the mobile device 100. Communication functions, including data and voice communications, are performed through a communication subsystem 104. The communication subsystem 104 receives messages from and sends messages to a wireless network 200. In this example embodiment of the mobile device 100, the communication subsystem 104 is configured in accordance with the Global System for Mobile Communication (GSM) and General Packet Radio Services (GPRS) standards. The GSM/GPRS wireless network is used worldwide and it is expected that these standards will be superseded eventually by Enhanced Data GSM Environment (EDGE) and Universal Mobile Telecommunications Service (UMTS). New standards are still being defined, but it is believed that they will have similarities to the network behavior described herein, and it will also be understood by persons skilled in the art that the example embodiments described herein are intended to use any other suitable standards that are developed in the future. The wireless link connecting the communication subsystem 104 with the wireless network 200 represents one or more different Radio Frequency (RF) channels, operating according to defined protocols specified for GSM/GPRS communications. With newer network protocols, these channels are capable of supporting both circuit switched voice communications and packet switched data communications.

Although the wireless network 200 associated with mobile device 100 is a GSM/GPRS wireless network in one example implementation, other wireless networks may also be associated with the mobile device 100 in variant implementations. The different types of wireless networks that may be employed include, for example, data-centric wireless networks, voice-centric wireless networks, and dual-mode networks that can support both voice and data communications over the same physical base stations. Combined dual-mode networks include, but are not limited to, Code Division Multiple Access (CDMA) or CDMA2000 networks, GSM/GPRS networks (as mentioned above), and future third-generation (3G) networks like EDGE and UMTS. Some other examples of data-centric networks include WiFi 802.11, Mobitex™ and DataTAC™ network communication systems. Examples of other voice-centric data networks include Personal Communication Systems (PCS) networks like GSM and Time Division Multiple Access (TDMA) systems.

The main processor 102 also interacts with additional subsystems such as a Random Access Memory (RAM) 106, a flash memory 108, a display 110, an auxiliary input/output (I/O) subsystem 112, a data port 114, a keyboard 116, a speaker 118, a microphone 120, short-range communications 122 and other device subsystems 124.

Some of the subsystems of the mobile device 100 perform communication-related functions, whereas other subsystems may provide "resident" or on-device functions. By way of example, the display 110 and the keyboard 116 may be used for both communication-related functions, such as entering a text message for transmission over the network 200, and device-resident functions such as a calculator or task list.

The mobile device 100 can send and receive communication signals over the wireless network 200 after required network registration or activation procedures have been completed. Network access is associated with a subscriber or user of the mobile device 100. To identify a subscriber, the mobile device 100 requires a SIM/RUIM card 126 (i.e., Subscriber Identity Module or a Removable User Identity Module) to be inserted into a SIM/RUIM interface 128 in order to communicate with a network. The SIM card or RUIM 126 is one type of a conventional "smart card" that can be used to identify a subscriber of the mobile device 100 and to personalize the mobile device 100, among other things. Without the SIM card 126, the mobile device 100 is not fully operational for communication with the wireless network 200. By inserting the SIM card/RUIM 126 into the SIM/RUIM interface 128, a subscriber can access all subscribed services. Services may include: web browsing and messaging such as email, voice mail, Short Message Service (SMS), and Multimedia Messaging Services (MMS). More advanced services may include: point of sale, field service and sales force automation. The SIM card/RUIM 126 includes a processor and memory for storing information. Once the SIM card/RUIM 126 is inserted into the SIM/RUIM interface 128, it is coupled to the main processor 102. In order to identify the subscriber, the SIM card/RUIM 126 can include some user parameters such as an International Mobile Subscriber Identity (IMSI). An advantage of using the SIM card/RUIM 126 is that a subscriber is not necessarily bound by any single physical mobile device. The SIM card/RUIM 126 may store additional subscriber information for a mobile device as well, including datebook (or calendar) information and recent call information. Alternatively, user identification information can also be programmed into the flash memory 108.

The mobile device 100 is a battery-powered device and includes a battery interface 132 for receiving one or more rechargeable batteries 130. In at least some example embodiments, the battery 130 can be a smart battery with an embedded microprocessor. The battery interface 132 is coupled to a regulator (not shown), which assists the battery 130 in providing power V+ to the mobile device 100. Although current technology makes use of a battery, future technologies such as micro fuel cells may provide the power to the mobile device 100.

The mobile device 100 also includes an operating system 134 and software components 136 to 146 which are described in more detail below. The operating system 134 and the software components 136 to 146 that are executed by the main processor 102 are typically stored in a persistent store such as the flash memory 108, which may alternatively be a read-only memory (ROM) or similar storage element (not shown). Those skilled in the art will appreciate that portions of the operating system 134 and the software components 136 to 146, such as specific device applications, or parts thereof, may be temporarily loaded into a volatile store such as the RAM 106. Other software components can also be included, as is well known to those skilled in the art.

The subset of software applications 136 that control basic device operations, including data and voice communication applications, will normally be installed on the mobile device 100 during its manufacture. Other software applications include a message application 138 that can be any suitable software program that allows a user of the mobile device 100 to send and receive electronic messages. Various alternatives exist for the message application 138 as is well known to those skilled in the art. Messages that have been sent or received by the user are typically stored in the flash memory 108 of the mobile device 100 or some other suitable storage element in the mobile device 100. In at least some example embodiments, some of the sent and received messages may be stored remotely from the device 100 such as in a data store of an associated host system that the mobile device 100 communicates with.

The software applications can further include a device state module 140, a Personal Information Manager (PIM) 142, and other suitable modules (not shown). The device state module 140 provides persistence, i.e., the device state module 140 ensures that important device data is stored in persistent memory, such as the flash memory 108, so that the data is not lost when the mobile device 100 is turned off or loses power.

The PIM 142 includes functionality for organizing and managing data items of interest to the user, such as, but not limited to, email, contacts, calendar events, voice mails, appointments, and task items. A PIM application has the ability to send and receive data items via the wireless network 200. PIM data items may be seamlessly integrated, synchronized, and updated via the wireless network 200 with the mobile device subscriber's corresponding data items stored and/or associated with a host computer system. This functionality creates a mirrored host computer on the mobile device 100 with respect to such items. This can be particularly advantageous when the host computer system is the mobile device subscriber's office computer system.

The mobile device 100 also includes a connect module 144, and an IT policy module 146. The connect module 144 implements the communication protocols that are required for the mobile device 100 to communicate with the wireless infrastructure and any host system, such as an enterprise system, that the mobile device 100 is authorized to interface with. Examples of a wireless infrastructure and an enterprise system are given in FIGS. 6 and 7, which are described in more detail below.

The connect module 144 includes a set of APIs that can be integrated with the mobile device 100 to allow the mobile device 100 to use any number of services associated with the enterprise system. The connect module 144 allows the mobile device 100 to establish an end-to-end secure, authenticated communication pipe with the host system. A subset of applications for which access is provided by the connect module 144 can be used to pass IT policy commands from the host system to the mobile device 100. This can be done in a wireless or wired manner. These instructions can then be passed to the IT policy module 146 to modify the configuration of the device 100. Alternatively, in some cases, the IT policy update can also be done over a wired connection.

The IT policy module 146 receives IT policy data that encodes the IT policy. The IT policy module 146 then ensures that the IT policy data is authenticated by the mobile device 100. The IT policy data can then be stored in the flash memory 106 in its native form. After the IT policy data is stored, a global notification can be sent by the IT policy module 146 to all of the applications residing on the mobile device 100. Applications for which the IT policy may be applicable then respond by reading the IT policy data to look for IT policy rules that are applicable.

The IT policy module 146 can include a parser (not shown), which can be used by the applications to read the IT policy rules. In some cases, another module or application can provide the parser. Grouped IT policy rules, described in more detail below, are retrieved as byte streams, which are then sent (recursively, in a sense) into the parser to determine the values of each IT policy rule defined within the grouped IT policy rule. In at least some example embodiments, the IT policy module 146 can determine which applications are affected by the IT policy data and send a notification to only those applications. In either of these cases, for applications that aren't running at the time of the notification, the applications can call the parser or the IT policy module 146 when they are executed to determine if there are any relevant IT policy rules in the newly received IT policy data.

All applications that support rules in the IT Policy are coded to know the type of data to expect. For example, the value that is set for the "WEP User Name" IT policy rule is known to be a string; therefore the value in the IT policy data that corresponds to this rule is interpreted as a string. As another example, the setting for the "Set Maximum Password Attempts" IT policy rule is known to be an integer, and therefore the value in the IT policy data that corresponds to this rule is interpreted as such.

After the IT policy rules have been applied to the applicable applications or configuration files, the IT policy module 146 sends an acknowledgement back to the host system to indicate that the IT policy data was received and successfully applied.

Other types of software applications can also be installed on the mobile device 100. These software applications can be third party applications, which are added after the manufacture of the mobile device 100. Examples of third party applications include games, calculators, utilities, etc.

The additional applications can be loaded onto the mobile device 100 through at least one of the wireless network 200, the auxiliary I/O subsystem 112, the data port 114, the short-range communications subsystem 122, or any other suitable device subsystem 124. This flexibility in application installation increases the functionality of the mobile device 100 and may provide enhanced on-device functions, communication-related functions, or both. For example, secure communication applications may enable electronic commerce functions and other such financial transactions to be performed using the mobile device 100.

The data port 114 enables a subscriber to set preferences through an external device or software application and extends the capabilities of the mobile device 100 by providing for information or software downloads to the mobile device 100 other than through a wireless communication network. The alternate download path may, for example, be used to load an encryption key onto the mobile device 100 through a direct and thus reliable and trusted connection to provide secure device communication.

The data port 114 can be any suitable port that enables data communication between the mobile device 100 and another computing device. The data port 114 can be a serial or a parallel port. In some instances, the data port 114 can be a USB port that includes data lines for data transfer and a supply line that can provide a charging current to charge the battery 130 of the mobile device 100.

The short-range communications subsystem 122 provides for communication between the mobile device 100 and different systems or devices, without the use of the wireless network 200. For example, the subsystem 122 may include an infrared device and associated circuits and components for short-range communication. Examples of short-range communication standards include standards developed by the Infrared Data Association (IrDA), Bluetooth, and the 802.11 family of standards developed by IEEE.

In use, a received signal such as a text message, an email message, or web page download will be processed by the communication subsystem 104 and input to the main processor 102. The main processor 102 will then process the received signal for output to the display 110 or alternatively to the auxiliary I/O subsystem 112. A subscriber may also compose data items, such as email messages, for example, using the keyboard 116 in conjunction with the display 110 and possibly the auxiliary I/O subsystem 112. The auxiliary subsystem 112 may include devices such as: a touch screen, mouse, track ball, infrared fingerprint detector, or a roller wheel with dynamic button pressing capability. The keyboard 116 is preferably an alphanumeric keyboard and/or telephone-type keypad. However, other types of keyboards may also be used. A composed item may be transmitted over the wireless network 200 through the communication subsystem 104.

For voice communications, the overall operation of the mobile device 100 is substantially similar, except that the received signals are output to the speaker 118, and signals for transmission are generated by the microphone 120. Alternative voice or audio I/O subsystems, such as a voice message recording subsystem, can also be implemented on the mobile device 100. Although voice or audio signal output is accomplished primarily through the speaker 118, the display 110 can also be used to provide additional information such as the identity of a calling party, duration of a voice call, or other voice call related information.

Figure 5:
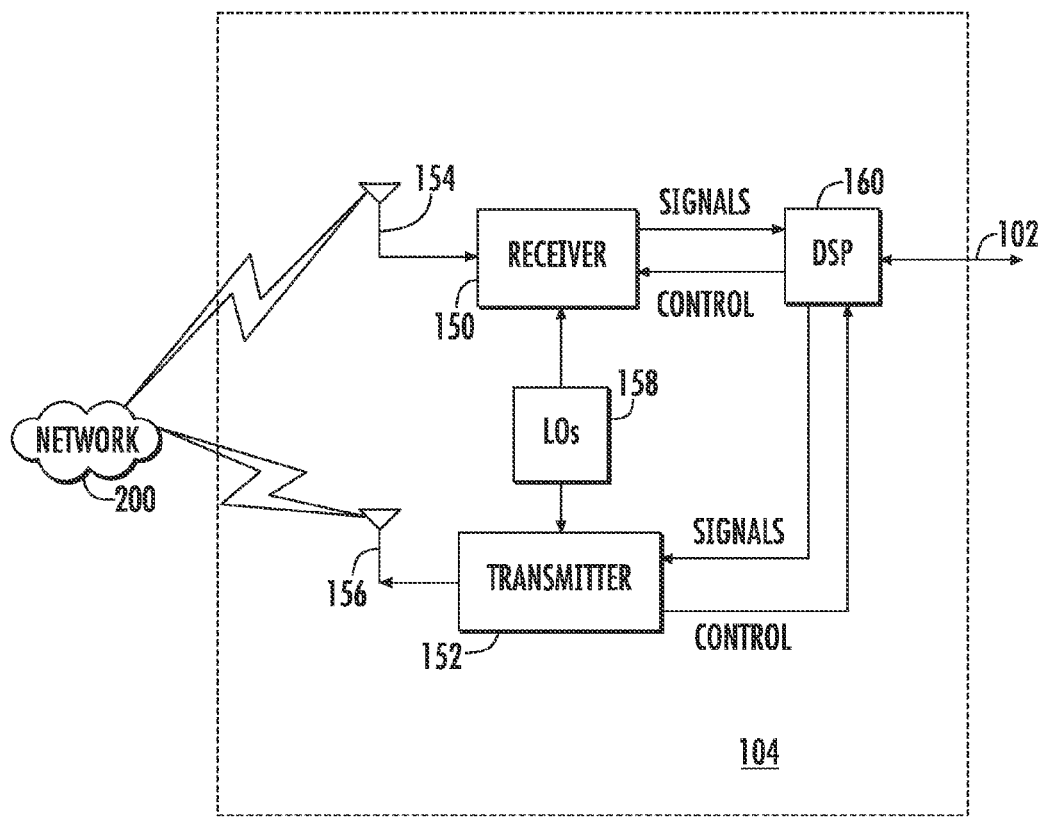
FIG. 5 is a block diagram of an example embodiment of a communication subsystem component of the mobile device of FIG. 4.

Referring now to FIG. 5, an example block diagram of the communication subsystem component 104 is shown. The communication subsystem 104 includes a receiver 150, a transmitter 152, as well as associated components such as one or more embedded or internal antenna elements 154 and 156, Local Oscillators (LOs) 158, and a processing module such as a Digital Signal Processor (DSP) 160. The particular design of the communication subsystem 104 is dependent upon the communication network 200 with which the mobile device 100 is intended to operate. Thus, it should be understood that the design illustrated in FIG. 5 serves only as one example.

Signals received by the antenna 154 through the wireless network 200 are input to the receiver 150, which may perform such common receiver functions as signal amplification, frequency down conversion, filtering, channel selection, and analog-to-digital (A/D) conversion. A/D conversion of a received signal allows more complex communication functions such as demodulation and decoding to be performed in the DSP 160. In a similar manner, signals to be transmitted are processed, including modulation and encoding, by the DSP 160. These DSP-processed signals are input to the transmitter 152 for digital-to-analog (D/A) conversion, frequency up conversion, filtering, amplification and transmission over the wireless network 200 via the antenna 156. The DSP 160 not only processes communication signals, but also provides for receiver and transmitter control. For example, the gains applied to communication signals in the receiver 150 and the transmitter 152 may be adaptively controlled through automatic gain control algorithms implemented in the DSP 160.

The wireless link between the mobile device 100 and the wireless network 200 can contain one or more different channels, typically different RF channels, and associated protocols used between the mobile device 100 and the wireless network 200. An RF channel is a limited resource that must be conserved, typically due to limits in overall bandwidth and limited battery power of the mobile device 100.

When the mobile device 100 is fully operational, the transmitter 152 is typically keyed or turned on only when it is transmitting to the wireless network 200 and is otherwise turned off to conserve resources. Similarly, the receiver 150 is periodically turned off to conserve power until it is needed to receive signals or information (if at all) during designated time periods.

Figure 6:
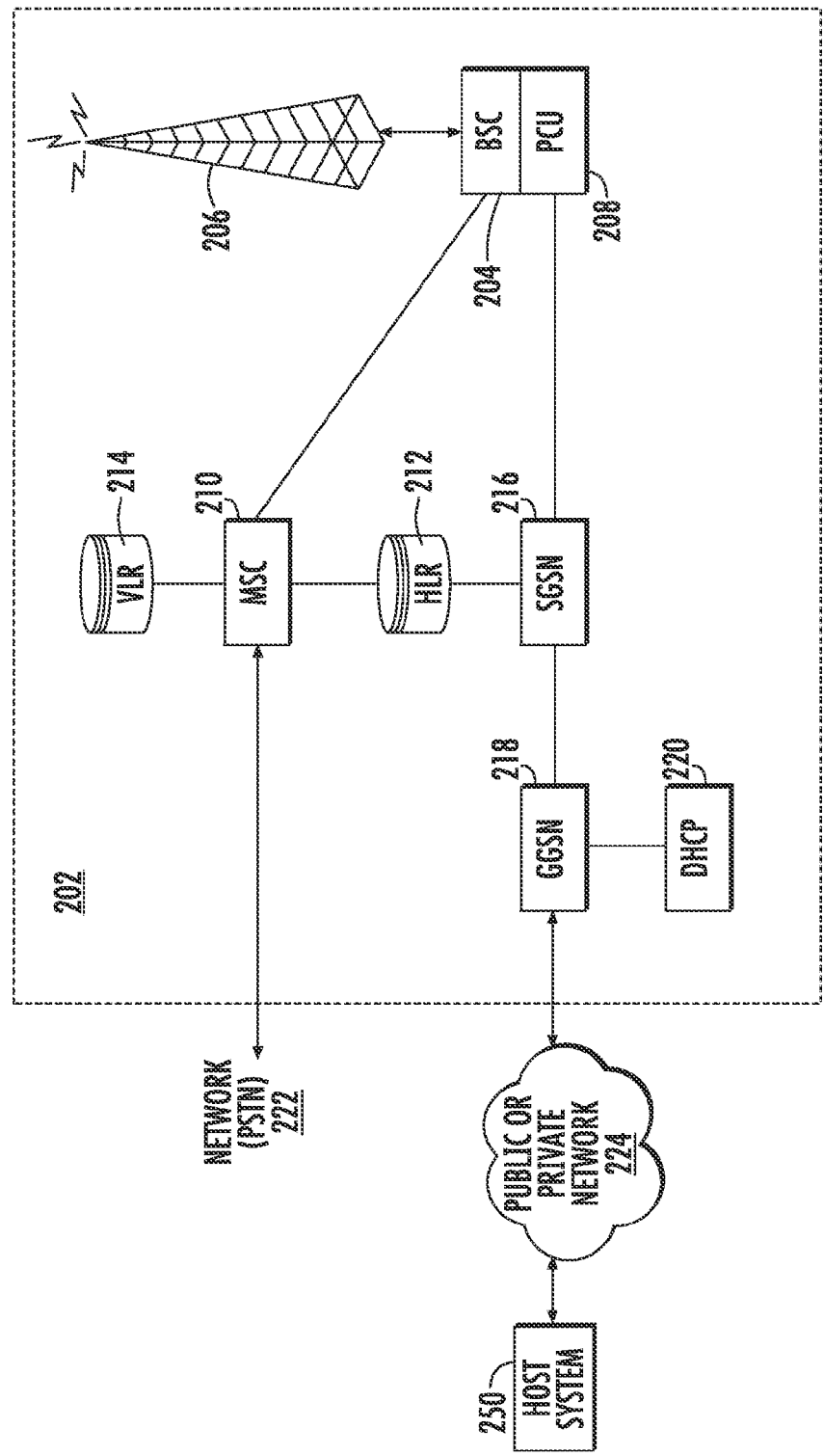
FIG. 6 is an example block diagram of a node of a wireless network.

Referring now to FIG. 6, a block diagram of an example implementation of a node 202 of the wireless network 200 is shown. In practice, the wireless network 200 includes one or more nodes 202. In conjunction with the connect module 144, the mobile device 100 can communicate with the node 202 within the wireless network 200. In the example implementation of FIG. 6, the node 202 is configured in accordance with General Packet Radio Service (GPRS) and Global Systems for Mobile (GSM) technologies. The node 202 includes a base station controller (BSC) 204 with an associated tower station 206, a Packet Control Unit (PCU) 208 added for GPRS support in GSM, a Mobile Switching Center (MSC) 210, a Home Location Register (HLR) 212, a Visitor Location Registry (VLR) 214, a Serving GPRS Support Node (SGSN) 216, a Gateway GPRS Support Node (GGSN) 218, and a Dynamic Host Configuration Protocol (DHCP) 220. This list of components is not meant to be an exhaustive list of the components of every node 202 within a GSM/GPRS network, but rather a list of components that are commonly used in communications through the network 200.

In a GSM network, the MSC 210 is coupled to the BSC 204 and to a landline network, such as a Public Switched Telephone Network (PSTN) 222 to satisfy circuit switched requirements. The connection through the PCU 208, the SGSN 216 and the GGSN 218 to a public or private network (Internet) 224 (also referred to herein generally as a shared network infrastructure) represents the data path for GPRS capable mobile devices. In a GSM network extended with GPRS capabilities, the BSC 204 also contains the Packet Control Unit (PCU) 208 that connects to the SGSN 216 to control segmentation, radio channel allocation and to satisfy packet switched requirements. To track the location of the mobile device 100 and availability for both circuit switched and packet switched management, the HLR 212 is shared between the MSC 210 and the SGSN 216. Access to the VLR 214 is controlled by the MSC 210.

The station 206 is a fixed transceiver station and together with the BSC 204 form fixed transceiver equipment. The fixed transceiver equipment provides wireless network coverage for a particular coverage area commonly referred to as a "cell." The fixed transceiver equipment transmits communication signals to and receives communication signals from mobile devices within its cell via the station 206. The fixed transceiver equipment normally performs such functions as modulation and possibly encoding and/or encryption of signals to be transmitted to the mobile device 100 in accordance with particular, usually predetermined, communication protocols and parameters, under control of its controller. The fixed transceiver equipment similarly demodulates and possibly decodes and decrypts, if necessary, any communication signals received from the mobile device 100 within its cell. Communication protocols and parameters may vary between different nodes. For example, one node may employ a different modulation scheme and operate at different frequencies than other nodes.

For all mobile devices 100 registered with a specific network, permanent configuration data such as a user profile is stored in the HLR 212. The HLR 212 also contains location information for each registered mobile device and can be queried to determine the current location of a mobile device. The MSC 210 is responsible for a group of location areas and stores the data of the mobile devices currently in its area of responsibility in the VLR 214. Further, the VLR 214 also contains information on mobile devices that are visiting other networks. The information in the VLR 214 includes part of the permanent mobile device data transmitted from the HLR 212 to the VLR 214 for faster access. By moving additional information from a remote HLR 212 node to the VLR 214, the amount of traffic between these nodes can be reduced so that voice and data services can be provided with faster response times and at the same time requiring less use of computing resources.

The SGSN 216 and the GGSN 218 are elements added for GPRS support, namely packet switched data support, within GSM. The SGSN 216 and the MSC 210 have similar responsibilities within the wireless network 200 by keeping track of the location of each mobile device 100. The SGSN 216 also performs security functions and access control for data traffic on the wireless network 200. The GGSN 218 provides internetworking connections with external packet switched networks and connects to one or more SGSN's 216 via an Internet Protocol (IP) backbone network operated within the network 200. During normal operations, a given mobile device 100 must perform a "GPRS Attach" to acquire an IP address and to access data services. This requirement is not present in circuit switched voice channels as Integrated Services Digital Network (ISDN) addresses are used for routing incoming and outgoing calls. Currently, all GPRS capable networks use private, dynamically assigned IP addresses, thus requiring the DHCP server 220 connected to the GGSN 218. There are many mechanisms for dynamic IP assignment, including using a combination of a Remote Authentication Dial-In User Service (RADIUS) server and a DHCP server. Once the GPRS Attach is complete, a logical connection is established from a mobile device 100, through the PCU 208, and the SGSN 216 to an Access Point Node (APN) within the GGSN 218. The APN represents a logical end of an IP tunnel that can either access direct Internet compatible services or private network connections. The APN also represents a security mechanism for the network 200, insofar as each mobile device 100 must be assigned to one or more APNs and mobile devices 100 cannot exchange data without first performing a GPRS Attach to an APN that it has been authorized to use. The APN may be considered to be similar to an Internet domain name such as "myconnection.wireless.com".

Once the GPRS Attach operation is complete, a tunnel is created and all traffic is exchanged within standard IP packets using any protocol that can be supported in IP packets. This includes tunneling methods such as IP over IP as in the case with some IPSecurity (IPsec) connections used with Virtual Private Networks (VPN). These tunnels are also referred to as Packet Data Protocol (PDP) Contexts and there are a limited number of these available in the network 200. To maximize use of the PDP Contexts, the network 200 will run an idle timer for each PDP Context to determine if there is a lack of activity. When a mobile device 100 is not using its POP Context, the PDP Context can be de-allocated and the IP address returned to the IP address pool managed by the DHCP server 220.

Referring now to FIG. 7, shown therein is a block diagram illustrating components of an example configuration of a host system 250 that the mobile device 100 can communicate with in conjunction with the connect module 144. The host system 250 will typically be a corporate enterprise or other local area network (LAN), but may also be a home office computer or some other private system, for example, in variant implementations. In this example shown in FIG. 7, the host system 250 is depicted as a LAN of an organization to which a user of the mobile device 100 belongs. Typically, a plurality of mobile devices can communicate wirelessly with the host system 250 through one or more nodes 202 of the wireless network 200.

The host system 250 includes a number of network components connected to each other by a network 260. For instance, a user's desktop computer 262*a* with an accompanying cradle 264 for the user's mobile device 100 is situated on a LAN connection. The cradle 264 for the mobile device 100 can be coupled to the computer 262*a* by a serial or a Universal Serial Bus (USB) connection, for example. Other user computers 262*b*-262*n* are also situated on the network 260, and each may or may not be equipped with an accompanying cradle 264. The cradle 264 facilitates the loading of information (e.g., PIM data, private symmetric encryption keys to facilitate secure communications) from the user computer 262*a* to the mobile device 100, and may be particularly useful for bulk information updates often performed in initializing the mobile device 100 for use. The information downloaded to the mobile device 100 may include certificates used in the exchange of messages.

It will be understood by persons skilled in the art that the user computers 262*a*-262*n* will typically also be connected to other peripheral devices, such as printers, etc. which are not explicitly shown in FIG. 7. Furthermore, only a subset of network components of the host system 250 are shown in FIG. 4 for ease of exposition, and it will be understood by persons skilled in the art that the host system 250 will include additional components that are not explicitly shown in FIG. 4 for this example configuration. More generally, the host system 250 may represent a smaller part of a larger network (not shown) of the organization, and may include different components and/or be arranged in different topologies than that shown in the example embodiment of FIG. 7.

To facilitate the operation of the mobile device 100 and the wireless communication of messages and message-related data between the mobile device 100 and components of the host system 250, a number of wireless communication support components 270 can be provided. In some implementations, the wireless communication support components 270 can include a message management server 272, a mobile data server 274, a contact server 276, and a device manager module 278. The device manager module 278 includes an IT Policy editor 280 and an IT user property editor 282, as well as other software components for allowing an IT administrator to configure the mobile devices 100. In an alternative embodiment, there may be one editor that provides the functionality of both the IT policy editor 280 and the IT user property editor 282. The support components 270 also include a data store 284, and an IT policy server 286. The IT policy server 286 includes a processor 288, a network interface 290 and a memory unit 292. The processor 288 controls the operation of the IT policy server 286 and executes functions related to the standardized IT policy as described below. The network interface 290 allows the IT policy server 286 to communicate with the various components of the host system 250 and the mobile devices 100. The memory unit 292 can store functions used in implementing the IT policy as well as related data. Those skilled in the art know how to implement these various components. Other components may also be included as is well known to those skilled in the art. Further, in some implementations, the data store 284 can be part of any one of the servers.

In this example embodiment, the mobile device 100 communicates with the host system 250 through node 202 of the wireless network 200 and a shared network infrastructure 224 such as a service provider network or the public Internet. Access to the host system 250 may be provided through one or more routers (not shown), and computing devices of the host system 250 may operate from behind a firewall or proxy server 266. The proxy server 266 provides a secure node and a wireless internet gateway for the host system 250. The proxy server 266 intelligently routes data to the correct destination server within the host system 250.

In some implementations, the host system 250 can include a wireless VPN router (not shown) to facilitate data exchange between the host system 250 and the mobile device 100. The wireless VPN router allows a VPN connection to be established directly through a specific wireless network to the mobile device 100. The wireless VPN router can be used with the Internet Protocol (IP) Version 6 (IPV6) and IP-based wireless networks. This protocol can provide enough IP addresses so that each mobile device has a dedicated IP address, making it possible to push information to a mobile device at any time. An advantage of using a wireless VPN router is that it can be an off-the-shelf VPN component, and does not require a separate wireless gateway and separate wireless infrastructure. A VPN connection can preferably be a Transmission Control Protocol (TCP)/IP or User Datagram Protocol (UDP)/IP connection for delivering the messages directly to the mobile device 100 in this alternative implementation.

Messages intended for a user of the mobile device 100 are initially received by a message server 268 of the host system 250. Such messages may originate from any number of sources. For instance, a message may have been sent by a sender from the computer 262b within the host system 250, from a different mobile device (not shown) connected to the wireless network 200 or a different wireless network, or from a different computing device, or other device capable of sending messages, via the shared network infrastructure 224, possibly through an application service provider (ASP) or Internet service provider (ISP), for example.

The message server 268 typically acts as the primary interface for the exchange of messages, particularly email messages, within the organization and over the shared network infrastructure 224. Each user in the organization that has been set up to send and receive messages is typically associated with a user account managed by the message server 268. Some example implementations of the message server 268 include a Microsoft Exchange™ server, a Lotus Domino™ server, a Novell Groupwise™ server, or another suitable mail server installed in a corporate environment. In some implementations, the host system 250 may include multiple message servers 268. The message server 268 may also be adapted to provide additional functions beyond message management, including the management of data associated with calendars and task lists, for example.

When messages are received by the message server 268, they are typically stored in a data store associated with the message server 268. In at least some example embodiments, the data store may be a separate hardware unit, such as data store 284, that the message server 268 communicates with. Messages can be subsequently retrieved and delivered to users by accessing the message server 268. For instance, an email client application operating on a user's computer 262a may request the email messages associated with that user's account stored on the data store associated with the message server 268. These messages are then retrieved from the data store and stored locally on the computer 262a. The data store associated with the message server 268 can store copies of each message that is locally stored on the mobile device 100. Alternatively, the data store associated with the message server 268 can store all of the messages for the user of the mobile device 100 and only a smaller number of messages can be stored on the mobile device 100 to conserve memory. For instance, the most recent messages (i.e., those received in the past two to three months for example) can be stored on the mobile device 100.

When operating the mobile device 100, the user may wish to have email messages retrieved for delivery to the mobile device 100. The message application 138 operating on the mobile device 100 may also request messages associated with the user's account from the message server 268. The message application 138 may be configured (either by the user or by an administrator, possibly in accordance with an organization's information technology (IT) policy) to make this request at the direction of the user, at some pre-defined time interval, or upon the occurrence of some pre-defined event. In some implementations, the mobile device 100 is assigned its own email address, and messages addressed specifically to the mobile device 100 are automatically redirected to the mobile device 100 as they are received by the message server 268.

The message management server 272 can be used to specifically provide support for the management of messages, such as email messages, that are to be handled by mobile devices. Generally, while messages are still stored on the message server 268, the message management server 272 can be used to control when, if, and how messages are sent to the mobile device 100. The message management server 272 also facilitates the handling of messages composed on the mobile device 100, which are sent to the message server 268 for subsequent delivery.

For example, the message management server 272 may monitor the user's "mailbox" (e.g., the message store associated with the user's account on the message server 268) for new email messages, and apply user-definable filters to new messages to determine if and how the messages are relayed to the user's mobile device 100. The message management server 272 may also compress and encrypt new messages (e.g., using an encryption technique such as Data Encryption Standard (DES), Triple DES, or Advanced Encryption Standard (AES)) and push them to the mobile device 100 via the shared network infrastructure 224 and the wireless network 200. The message management server 272 may also receive messages composed on the mobile device 100 (e.g., encrypted using Triple DES), decrypt and decompress the composed messages, re-format the composed messages if desired so that they will appear to have originated from the user's computer 262a, and re-route the composed messages to the message server 268 for delivery.

Certain properties or restrictions associated with messages that are to be sent from and/or received by the mobile device 100 can be defined (e.g., by an administrator in accordance with IT policy) and enforced by the message management server 272. These may include whether the mobile device 100 may receive encrypted and/or signed messages, minimum encryption key sizes, whether outgoing messages must be encrypted and/or signed, and whether copies of all secure messages sent from the mobile device 100 are to be sent to a pre-defined copy address, for example.

The message management server 272 may also be adapted to provide other control functions, such as only pushing certain message information or pre-defined portions (e.g., "blocks") of a message stored on the message server 268 to the mobile device 100. For example, in some cases, when a message is initially retrieved by the mobile device 100 from the message server 268, the message management server 272 may push only the first part of a message to the mobile device 100, with the part being of a pre-defined size (e.g., 2 KB). The user can then request that more of the message be delivered in similar-sized blocks by the message management server 272 to the mobile device 100, possibly up to a maximum pre-defined message size. Accordingly, the message management server 272 facilitates better control over the type of data and the amount of data that is communicated to the mobile device 100, and can help to minimize potential waste of bandwidth or other resources.

The mobile data server 274 encompasses any other server that stores information that is relevant to the corporation. The mobile data server 274 may include, but is not limited to, databases, online data document repositories, customer relationship management (CRM) systems, or enterprise resource planning (ERP) applications.

The contact server 276 can provide information for a list of contacts for the user in a similar fashion as the address book on the mobile device 100. Accordingly, for a given contact, the contact server 276 can include the name, phone number, work address and email address of the contact, among other information. The contact server 276 can also provide a global address list that contains the contact information for all of the contacts associated with the host system 250.

It will be understood by persons skilled in the art that the message management server 272, the mobile data server 274, the contact server 276, the device manager module 278, the data store 284 and the IT policy server 286 do not need to be implemented on separate physical servers within the host system 250. For example, some or all of the functions associated with the message management server 272 may be integrated with the message server 268, or some other server in the host system 250. Alternatively, the host system 250 may include multiple message management servers 272, particularly in variant implementations where a large number of mobile devices need to be supported.

Alternatively, in some example embodiments, the IT policy server 286 can provide the IT policy editor 280, the IT user property editor 282 and the data store 284. In some cases, the IT policy server 286 can also provide the device manager module 278. The processor 288 of the IT policy server 286 can be used to perform the various steps of a method for providing IT policy data that is customizable on a per-user basis. The processor 288 can execute the editors 280 and 282. In some cases, the functionality of the editors 280 and 282 can be provided by a single editor. In some cases, the memory unit 292 can provide the data store 284.

The device manager module 278 provides an IT administrator with a graphical user interface with which the IT administrator interacts to configure various settings for the mobile devices 100. As mentioned, the IT administrator can use IT policy rules to define behaviors of certain applications on the mobile device 100 that are permitted such as phone, web browser or Instant Messenger use. The IT policy rules can also be used to set specific values for configuration settings that an organization requires on the mobile devices 100 such as auto signature text, WLAN/VoIP/VPN configuration, security requirements (e.g., encryption algorithms, password rules, etc.), specifying themes or applications that are allowed to run on the mobile device 100, and the like.

FIGS. 2 and 3 are flow diagrams illustrating method aspects associated with the system of FIG. 1. Some of the steps illustrated in the flow diagrams may be performed in an order other than that which is described. Also, it should be appreciated that not all of the steps described in the flow diagrams are required to be performed, that additional steps may be added, and that some of the illustrated steps may be substituted with other steps.

Many modifications and other embodiments will come to the mind of one skilled in the art having the benefit of the teachings presented in the foregoing descriptions and the associated drawings. Therefore, it is understood that various modifications and example embodiments are intended to be included within the scope of the appended claims.

That which is claimed is:

1. A communications system comprising:
at least one data storage device configured to store electronic records and record identifications (IDs) therefor in at least one account;
at least one mobile wireless communications device associated with the at least one account; and
at least one polling server configured to
estimate a number of electronic records stored in the at least one account,
select a number of record IDs for a polling request based upon the estimated number,
perform the polling request of the at least one data storage device and retrieve therefrom respective record IDs for the at least one account based upon the selected number of record IDs, and
cause electronic records to be delivered to the at least one mobile wireless communications device based upon the retrieved record IDs.

2. The communications system of claim 1 wherein the at least one polling server is configured to select the number of record IDs in each polling request also based upon a time of completion of a prior request.

3. The communications system of claim 1 wherein the at least one polling server has an available memory level; and wherein the at least one polling server is configured to select the number of record IDs in each polling request also based upon the available memory level.

4. The communications system of claim 1 wherein the at least one polling server is configured to select the number of record IDs in each polling request also based upon a target number of requests to retrieve all record IDs for a given account.

5. The communications system of claim 1 wherein the at least one polling server is configured to select the number of record IDs in each polling request also based upon a minimum record ID request limit.

6. The communications system of claim 1 wherein the at least one polling server is configured to select the number of record IDs in each polling request also based upon a maximum record ID request limit.

7. The communications system of claim 1 wherein the at least one polling server is configured to determine new and deleted electronic records for the accounts based upon the polled record IDs.

8. The communications system of claim 1 wherein the electronic records comprise electronic messages.

9. The communications system of claim 8 wherein the electronic messages comprise electronic mail (email) messages.

10. The communications system of claim 1 wherein the electronic records comprise address book records, and the record IDs comprise address book record IDs.

11. The communications system of claim 1 wherein the electronic records comprise calendar records, and the record IDs comprise calendar record IDs.

12. The communications system of claim 1 wherein the at least one mobile wireless communications device comprises cellular devices.

13. A polling server for use with at least one data storage device configured to store electronic records and record identifications (IDs) therefor in at least one account and at least one mobile wireless communications device associated with the at least one account, the polling server comprising:
a storage device interface module configured to
estimate a number of electronic records stored in the at least one account,
select a number of record IDs for a polling request based upon the estimated number, and
perform the polling request of the at least one data storage device and retrieve therefrom respective record IDs for the at least one account based upon the selected number of record IDs; and
a mobile device interface module cooperating with the storage device interface module and configured to cause electronic records to the at least one mobile wireless communications device based upon the retrieved record IDs.

14. The polling server of claim 13 wherein the storage device interface module is configured to select the number of record IDs in each polling request also based upon a time of completion of a prior request.

15. The polling server of claim 13 wherein the storage device interface module has an available memory level; and wherein the first interface module is configured to select the number of record IDs in each polling request also based upon the available memory level.

16. The polling server of claim 13 wherein the storage device interface module is configured to select the number of record IDs in each polling request also based upon a target number of requests to retrieve all record IDs for a given account.

17. The polling server of claim 13 wherein the storage device interface module is configured to select the number of record IDs in each polling request also based upon at least one of a minimum record ID request limit and a maximum record ID request limit.

18. The polling server of claim 13 wherein the electronic records comprise electronic messages.

19. A communications method comprising:
storing electronic records and record identifications (IDs) therefor in at least one account on at least one data storage device;
associating at least one mobile wireless communications device with the at least one account;
estimating a number of electronic records stored in the at least one account using at least one polling server;
selecting a number of record IDs for a polling request based upon the estimated number using the at least one polling server;
performing the polling request of the at least one data storage device and retrieving therefrom respective record IDs for the at least one account using the at least one polling server based upon the selected number of record IDs; and
causing electronic records to be delivered to the at least one mobile wireless communications device based upon the record IDs using the at least one polling server.

20. The method of claim 19 wherein selecting comprises selecting the number of record IDs in each polling request also based upon a time of completion of a prior request.

21. The method of claim 19
wherein the at least one polling server has an available memory level; and wherein selecting comprises selecting the number of record IDs in each polling request also based upon the available memory level.

22. The method of claim 19 wherein selecting comprises selecting the number of record IDs in each polling request also based upon a target number of requests to retrieve all record IDs for a given account.

23. The method of claim 19 wherein selecting comprises selecting the number of record IDs in each polling request also based upon at least one of a minimum record ID request limit and a maximum record ID request limit.

24. The method of claim 19 further comprising determining new and deleted electronic messages for the accounts based upon the polled record IDs using the at least one polling server.

25. The method of claim 19 wherein the electronic records comprise electronic messages.

* * * * *